United States Patent [19]

Deschenes et al.

[11] 4,132,004

[45] Jan. 2, 1979

[54] REMOTE FIXTURE AIMING DEVICE

[75] Inventors: Charles E. Deschenes, Marblehead; Jeffrey D. Ingalls, Ipswich, both of Mass.

[73] Assignee: GTE Sylvania Incorporated, Stamford, Conn.

[21] Appl. No.: 824,355

[22] Filed: Aug. 15, 1977

Related U.S. Application Data

[63] Continuation of Ser. No. 653,992, Jan. 30, 1976, abandoned.

[51] Int. Cl.² .............................................. G01C 9/06
[52] U.S. Cl. ...................................... 33/366; 33/391; 33/402
[58] Field of Search ................. 33/366, 392, 401, 402, 33/391

[56] References Cited

U.S. PATENT DOCUMENTS

| 1,962,045 | 6/1934 | Walton | 33/392 X |
|---|---|---|---|
| 2,512,135 | 6/1950 | Bridy | 33/401 |
| 2,972,194 | 2/1961 | Ewing | 33/366 |
| 3,566,386 | 2/1971 | Hamilton | 33/366 |
| 3,852,890 | 12/1974 | Locklair et al. | 33/366 |
| 3,865,265 | 2/1975 | Brudi et al. | 33/366 |
| 3,869,805 | 3/1975 | Dieringer | 33/366 X |

Primary Examiner—Charles E. Phillips
Attorney, Agent, or Firm—Edward J. Coleman

[57] ABSTRACT

A sensing system for measuring the angle of aim of an adjustable remote lighting fixture comprising a pendulum adapted to be mounted on the remote fixture, a potentiometer coupled to the pendulum, and a battery-powered measuring circuit connectable by means of a cable to the potentiometer to thereby form a resistance bridge circuit. During operation, a microammeter connected in the bridge circuit provides a read out proportional to the angle formed between the suspended pendulum and a predetermined reference surface of the remote fixture.

1 Claim, 5 Drawing Figures

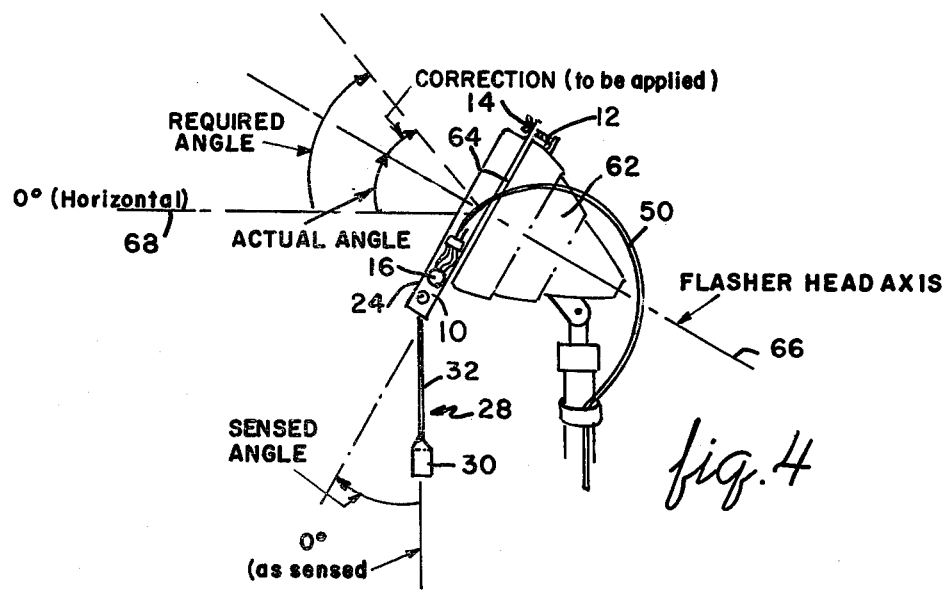
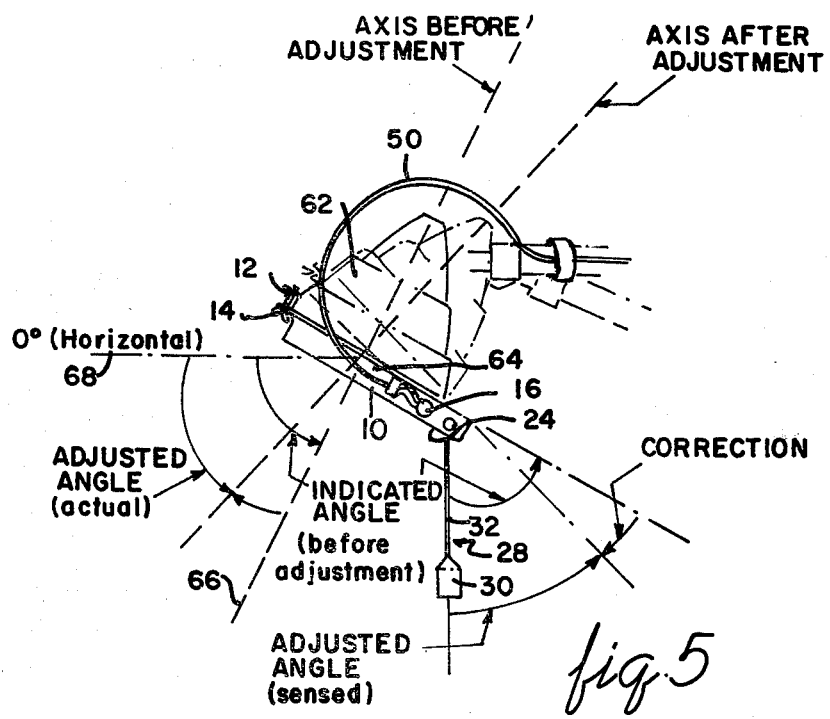

REMOTE FIXTURE AIMING DEVICE

This is a continuation, of application Ser. No. 653,992 filed Jan. 30, 1976 now abandoned.

BACKGROUND OF THE INVENTION

This invention relates to sensing systems, and more particularly, to means for facilitating the aiming of fixtures located at a remote position.

When a lighting fixture is mounted on a high tower or pole, a means of accurately aiming the projected beam is required. Conventional methods require equipment such as a "cherry picker" or a vehicle equipped with an extension ladder. The requirement of providing an accurate beam angle is particularly important in airport applications such as "medium intensity lighting approach systems with runway alignment indicator lights" (MALSR) wherein sequenced flasher lightheads are positioned at the top of relatively high towers.

SUMMARY OF THE INVENTION

Accordingly, it is an object of the present invention to provide an improved means for facilitating the accurate aiming of remote fixtures.

A particular object of the invention is to provide an improved sensing system for measuring the angle of aim of an adjustable remote lighting fixture.

These and other objects, advantages and features are attained, in accordance with the invention, by a sensing system comprising a pendulum, means for mounting the pendulum on the remote fixture so that the pendulum can be freely suspended therefrom, and a potentiometer having a rotatable shaft mechanically coupled to the pendulum. The system further includes an electrically energizable circuit means having a current measuring means and adapted when connected, say by a cable, to the remotely located potentiometer to form a resistance bridge therewith. During operation of the sensing system, with the pendulum mounted on and freely suspended from the remote fixture, the read out of the current measuring means is proportional to the angle formed between the pendulum and a predetermined reference portion of the fixture. Measurement of this pendulum angle indicates by geometrical relationships the quantity in question, namely, the angle of aim of the adjustable remote fixture.

BRIEF DESCRIPTION OF THE DRAWINGS

This invention will be more fully described hereinafter in conjunction with the accompanying drawings, in which:

FIG. 4 illustrates the pendulum assembly mounted on a flasher lighthead assembly with the supporting tower in its normally raised position; and FIG. 5 illustrates the pendulum assembly mounted on the flasher lighthead fixture with the supporting tower lowered for aim angle adjustment.

DESCRIPTION OF PREFERRED EMBODIMENT

Figure 1:
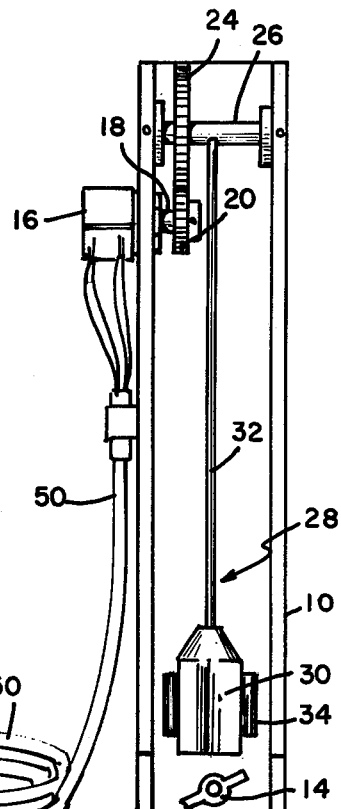
FIG. 1 is a view of the pendulum assembly and cable forming a portion of the system in accordance with the invention.

The portion of the sensing system shown in FIG. 1, which may be referred to as the pendulum assembly and cable, comprises a support bracket 10 having a spring loaded clamp 12 (best shown in FIGS. 4 and 5) secured by a wing nut 14 for attachment to the remote fixture. Mounted on one side of the support bracket 10 is a potentiometer 16 having a rotatable shaft 18 upon which is mounted a pinion gear 20. Shaft 18 is attached in the conventional manner to an adjustable center tap 22 of the potentiometer, shown in the schematic circuit diagram of FIG. 3. Engaging pinion gear 20 is a larger diameter drive gear 24 having a shaft 26 rotatably mounted on the support bracket 10. Pendulum 28 comprises a mass 30 attached to one end of a rod 32 which is attached at its other end to shaft 26 of the drive gear in a manner whereby the mass 30 is radially suspended from rotatable shaft 26. The assembly further includes a clip 34 which is attached to support bracket 10 for securing the pendulum mass 30, as shown in FIG. 1, when not in use.

Figure 2:
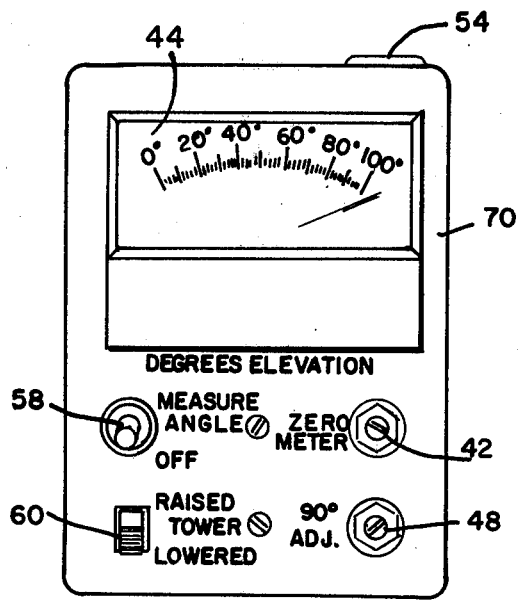
FIG. 2 is a view of the circuit and meter assembly forming a portion of the sensing system in accordance with the invention.

The system also includes a circuit and meter assembly as shown in FIG. 2. Referring also to the schematic diagram of FIG. 3, the circuit assembly comprises a pair of energy input terminals 36 and 38 across which is attached a first variable resistor 40 having a variable center tap 42. The circuit assembly also includes a current measuring means, in this instance illustrated as a DC microammeter having a scale of 0–100 microamps calibrated in degrees (i.e., 0–100 degrees). Connected between center tap 42 of variable resistor 40 and one terminal of the microammeter is a second variable resistor 46 having a center tap 48.

The circuit may also include a fixed resistor 49 connected in series with the variable resistor 46 if circuit adjustment parameters so require.

Figure 3:
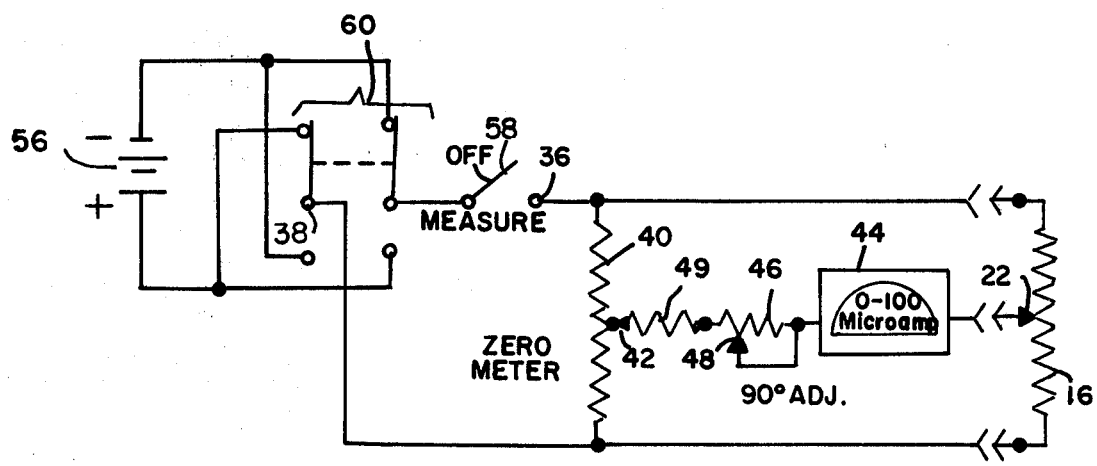
FIG. 3 is a schematic diagram of the sensing system circuit in accordance with the invention.

In order to connect the potentiometer 16 of the remotely located pendulum assembly of FIG. 1 to the circuit assembly of FIGS. 2 and 3, a long 3-wire cable 50 is electrically connected to the potentiometer at one end and provided at the other end with a three-prong plug 52 (FIG. 1) for connection to a mating socket 54 in the circuit and meter assembly (FIG. 2). As illustrated in FIG. 3, this connection is operative to electrically connect potentiometer 16 across the first variable resistor 40 and to connect the center tap 22 of the potentiometer to the other terminal of the microammeter. In this manner, a resistance bridge is formed, with the microammeter 44 series connected between the center taps of the potentiometer 16 and variable resistor 40.

A source of energy is provided to the measuring circuit by a means of a battery 56 connectable across the variable resistor 40 by means of an on-off switch 58. In order to enable measurement of either positive or negative angles of the pendulum, the circuit further includes a current reversing switch 60, which is coupled between the battery 56 and variable resistor 40 as illustrated in FIG. 3. For example, in the reversing switch position shown in the drawing, the positive terminal of battery 56 is connected through one of the contacts of switch 60 to energy input terminal 38, while the negative battery terminal is connected through the other contact of switch 60 to on-off switch 58, which is connectable to energy input terminal 36. Actuation of the mechanically linked contacts of switch 60 to the second position thereof connects the negative terminal of the battery to energy input terminal 38, and the positive battery terminal is connected to the on-off switch 58.

Referring now to FIG. 4, an application of the sensing system is illustrated wherein the pendulum assembly of FIG. 1 is attached to a light source 62 having a face 64 at a right angle to the optical axis 66 thereof. For example, light source 62 may comprise a sequenced flasher lighthead mounted in operating position on top of a tower, typically having a height of 40 feet or more. The face 64 of the flasher head comprises the reference portion of the fixture, and bracket 10 of the pendulum assembly is placed across the face 64 and attached to the flasher head 62 by the adjustable clamp 12. The pendulum 28 is unclamped and allowed to freely suspend from the bracket 10 while the pendulum is being supported from the rotatable shaft of drive gear 24. The angle of aim of the fixture is the angle between the horizontal plane 68 and the optical axis 66. Hence, the angle formed between pendulem 28 and the face of the light source, referred to as the "sensed angle", is equal to the angle of aim, denoted as the "actual angle" in FIG. 4. This, of course, follows geometrically as the suspended pendulum 28 is always at a right angle to the horizontal plane 68; hence, the angle between the flasher face 64 and the horizontal plane 68 is common to both the right angle between face 64 and optical axis 66 and the right angle between pendulum 28 and horizontal plane 68; the "actual angle" and "sensed angle" are thus both complementary to the same angle and therefore equal to each other.

In the above mentioned application, the sensing system of the invention functions as a remote fixture aiming device as it permits measuring the angle of aim of the sequenced flasher lighthead in the vertical plane, while the flasher is mounted in operating position on top of a tower, and it further permits precisely adjusting the angle with the tower lowered for access to the flasher. As noted, the system sensing device is a pendulum which, when unclamped, hangs vertically, at an angle with the support bracket 10 (and hence with the flasher head) that is equal to the vertical angle of aim. The pendulum stem (rod 32) is welded to a gear shaft 26 that transmits this angle through a gear train 24, 20 to a potentiometer. In one particular application, a 1000 ohms potentiometer 16 was employed. When the cable 50, which may be, for example, about 50 feet long, is plugged into the meter assembly (FIG. 2), a resistance bridge is formed. In one particular application, when bracket 10 was clamped onto the lighthead face with the tower raised, the pendulum impinged on the bracket body at 30°, so that the practical measuring range was 0° to +30°.

Referring to FIG. 2, the case 70 housing the battery, circuitry, and microammeter 44 of FIG. 3 (excluding potentiometer 16) has the following panel controls: a "measure angle/off" toggle switch comprising on/off switch 58 of FIG. 3, a "tower raised/lowered" slide switch comprising current reversing switch 60 of FIG. 3, and calibration control shafts with slots for a screw driver for setting the electrical 0° and 90° adjustments of the microammeter. The "zero meter" adjustment varies center tap 42 of variable resistor 40 in FIG. 3 and the "90° adjust" control varies the center tap 48 of variable resistor 46 in FIG. 3. A screw may be provided just below the meter face for permitting mechanical zeroing. The slide switch 60 is positioned on "raised" for measuring with the tower raised and on "lowered" for adjusting the angle when the tower is in the lowered position.

In the specific embodiment of the circuit described above, a 1.5 volt DC power source 56 was employed using two standard C-size dry cell batteries. Variable resistor 40 had a range up to 1000 ohms, and variable resistor 46 had a range up to 1000 ohms. A fixed resistor 49 of 330 ohms was connected in series with the variable resistor 46.

In operation, as noted above, the angle of interest is the angle between the optical axis of the flasher head and the horizontal plane. With the tower raised, the aiming device actually senses the angle between the face 64 of the flasher head, which is at a right angle to the axis, and the pendulum, which is at a right angle to the horizontal. The actual angle of aim and this sensed angle are always the same.

When the tower is lowered, the actual and sensed aim angles both, of course, change. But if the difference between the actual and required angle is noted when the tower is in the raised position, and applied as a correction to whatever angle the flasher head assumes in the lowered position, the aim angle will be correct when the tower is again raised to the operating position.

When the tower is lowered, and the flasher light and pendulum positions are as illustrated in FIG. 5, both the actual and sensed angles become less than 0°, which is the lowest reading on the meter scale. Placing the slide switch on the "lowered" position reverses the current flow so that these negative angles will now be indicated as positive angles on the meter. Because of this, an aim angle that is too small is corrected by decreasing the angle as sensed in the lowered position, and an angle that is too large is corrected by increasing the sensed angle.

Such corrective adjustments will be required, for example, when the flasher heads are first installed and when they are removed and repaired or replaced; also periodically following installation, and if there is a possibility of misalignment following storms, icing or other climatic stresses. Typically it is desired to maintain the aim angle within a ±1° tolerance limit.

Before using the sensing system to adjust the aim of a flasher head, the meter and system should be calibrated as follows. With the meter assembly on a flat surface, the pointer of the microammeter is mechanically zeroed, typically by a small screw just below the dial face. Next, with support bracket 10 placed on its side, the pendulum is released from its clip and aligned with a 0° adjust line on a template. With the "measure-angle switch" in the "off" position, the cable 50 is plugged into the meter case. Zero electrical adjustment then proceeds as follows. First the toggle switch 58 is placed on the "measure-angle" position to close the circuit. The "zero-meter" control (the center tap 42 of variable resistor 40) is then adjusted to set the meter pointer to exactly 0°. Next, the slide switch 60 is moved back and forth between the "raised" and "lowered" positions. If the meter is not precisely zeroed, there will be a motion of the pointer back and forth across zero. Readjustment is then necessary until the pointer remains exactly on 0° when the switch is actuated. Finally, switch 58 is placed in the "off" position and slide switch 60 is set to the "lowered" position.

The pendulum is then moved so that it aligns exactly with the 90° adjustment position line on a template and the 90° adjustment procedure is performed as follows. First, the slide switch 60 is set to the "lowered" position, and toggle switch 58 is placed in the "measure-angle" position. The "90° adjust" control shaft (center tap 48 of variable resistor 46) is then adjusted by means of a screw driver until the meter pointer is exactly on 90°. Thereafter the zero adjustment may be rechecked. The system is now calibrated and ready for use.

First the light tower is lowered to the working position of FIG. 5. The pendulum assembly bracket 10 is then attached to the face of the flasher head as shown. The flasher is then set as closely as possible to the required angle, as determined by eye. The pendulum is then released from its storage position. With the meter still not plugged in, the cable is taped to the tower to relieve strain on the potentiometer on the pendulum assembly. With the "measure-angle" switch at the "off" position, and the slide switch at the "raised" position, the meter assembly is plugged in. Next the tower is raised and secured in the operating position. Toggle switch 58 is now placed at the "measure-angle" position and the difference (+ or −) between the actual angle and the required angle of aim is recorded. Next the toggle switch 58 is placed in the "off" position and the slide switch 60 is positioned on "lowered". The tower is then lowered and braced to steady it.

With the slide switch 60 in the "lowered" position, toggle switch 58 is placed in the "measure-angle" position. If the angle as measured with the tower raised is greater than the required angle, the difference between the actual and the required angle is added to the angle as measured with the tower lowered. If the angle with the tower raised is less than the required angle, the difference from the angle as measured with the tower lowered is substracted. If the angle with the tower raised is the same as the required angle (±1°), no further adjustments are required.

For example, say that the angle measured with the tower raised is 23°, whereas the specified aim angle is 20°. When the tower is lowered, the measured angle will be 42°, and the required angle should be 45°. In this event, the flasher head is loosened and adjusted to the required ground angle of 45°. The flasher head is then secured, and the angle may be rechecked and readjusted if necessary. The cable 50 is unplugged, and the pendulum assemebly is removed from the face of the flasher head. The tower is then raised to its operating position and the procedure is complete.

Although the invention has been described with respect to a specific embodiment, it will be appreciated that modifications and changes may be made by those skilled in the art without departing from the true spirit and scope of the invention.

What we claim is:

1. In combination an adjustable remote lighting fixture mounted on a tower, said fixture including a light source having a face at a right angle to the optical axis thereof, and a sensing system for measuring the angle of aim of said fixture, which angle is that between the horizontal plane and said optical axis, said sensing system comprising:

a bracket attached across the face of said light source;
a pendulum suspended from a lower portion of said bracket at a location below the face of said light source for a range of movement unrestricted by said bracket and light source;
a potentiometer mounted on said bracket and having an adjustable center tap with a rotatable shaft attached thereto;
means for mechanically coupling said pendulum to the rotatable shaft of said potentiometer; said pendulum, bracket, potentiometer and mechanical coupling means being a remotely located assembly on said lighting fixture;
circuit means including a microammeter having a scale calibrated in degrees and a battery for providing a source of electrical energy; and
a cable electrically connected to said potentiometer of the remotely located assembly and having a plug for connection to said circuit means to thereby form a resistance bridge, whereby during operation of said sensing system with said pendulum mounted on and freely suspended from said remote fixture, the readout of said microammeter is proportional to the angle formed between said pendulum and said face of the light source, which angle is equal to said angle of aim;
said circuit means comprising a pair of energy input terminals connected to said battery through an on/off switch, a first variable resistor connected across said energy input terminals and having a variable center tap, means connecting one terminal of said microammeter to the center tap of said first variable resistor, said cable and plug being operable to connect said potentiometer of the remotely located assembly across said first variable resistor and to connect the center tap of said potentiometer to the other terminal of said microammeter, whereby said microammeter is series connected between the center taps of said potentiometer and first variable resistor, the center tap of said first variable resistor being adjustable for setting said meter to zero degrees in calibration with the zero degree position of said pendulum, and a current reversing switch coupled between said battery and said variable resistor for enabling measurement of either positive or negative angles of said pendulum, thereby facilitating correction of said angle of aim when said tower is in a lowered position.

* * * * *